United States Patent
Massaguer et al.

(10) Patent No.: US 9,678,726 B1
(45) Date of Patent: Jun. 13, 2017

(54) AUTOMATIC GENERATION OF PLUGINS FOR DEVELOPMENT TOOLS

(71) Applicant: Amazon Technologies, Inc., Seattle, WA (US)

(72) Inventors: Daniel Massaguer, Irvine, CA (US); Thomas Calogero Cascio, Irvine, CA (US); Jonathan Paul Thompson, Seattle, WA (US); Dong-Ju Nam, Costa Mesa, CA (US); Archana Bhanuprasad Naik, Union City, CA (US); Derek Steven Gebhard, Huntington Beach, CA (US); Spencer Lyle Voorheis, Arroyo Grande, CA (US); Peter Phan Han, Chino Hills, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/671,988

(22) Filed: Mar. 27, 2015

(51) Int. Cl.
*G06F 9/44* (2006.01)
*G06F 9/45* (2006.01)
*G06F 9/445* (2006.01)

(52) U.S. Cl.
CPC ............... *G06F 8/35* (2013.01); *G06F 8/41* (2013.01); *G06F 8/54* (2013.01)

(58) Field of Classification Search
CPC ..... G06F 8/35; G06F 8/41; G06F 8/54; G06F 9/44526
USPC ................ 717/104, 106–107, 140, 176–177
See application file for complete search history.

(56) References Cited

U.S. PATENT DOCUMENTS

| | | | | |
|---|---|---|---|---|
| 7,404,194 B2* | 7/2008 | Wason | ............... | G06Q 10/10 375/E7.025 |
| 7,610,577 B1* | 10/2009 | Roth | ............... | G06F 9/44542 709/246 |
| 8,001,519 B2* | 8/2011 | Conallen | ............... | G06F 8/316 717/105 |
| 8,819,698 B2* | 8/2014 | Sandholm | ............... | G06F 9/541 323/205 |
| 2005/0050311 A1* | 3/2005 | Joseph | ............... | G06F 17/30017 713/1 |
| 2014/0137090 A1* | 5/2014 | Whitcomb | ............... | G06F 8/47 717/163 |

OTHER PUBLICATIONS

InnovationM, "PhoneGap Development—Cross platform mobile development using PhoneGap", 2013, retrieved from http://www.innovationm.com/phonegap.php , 8 pages.*

(Continued)

*Primary Examiner* — Ted T Vo
(74) *Attorney, Agent, or Firm* — Thomas | Horstemeyer, LLP

(57) ABSTRACT

Disclosed are various embodiments for automatic generation of plugins for development tools. A platform-independent model is obtained for software functionality such as an application programming interface (API) to a software development kit (SDK). A platform-specific plugin is generated for a development environment based at least in part on the platform-independent model. The platform-specific plugin provides the software functionality for a particular platform of multiple platforms.

20 Claims, 5 Drawing Sheets

(56) References Cited

OTHER PUBLICATIONS

Emilijan Sekulovski, "Cross-Platform Mobile Application Generation with a Model-Driven Approach Based on IFML and Cross-Compilation", 2014, Master thesis, downloaded from https://www.politesi.polimi.it/bitstream/10589/101402/1/emilijan_sekulovski_master_thesis.pdf , pp. 1-52.*

* cited by examiner

AUTOMATIC GENERATION OF PLUGINS FOR DEVELOPMENT TOOLS

BACKGROUND

One persistent problem in software development relates to the existence of multiple, incompatible software platforms. Software written for one platform often cannot be executed on another platform. For example, an application written for the IOS platform may not be executable under the ANDROID platform, and vice versa.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the automatic generation of plugins for cross-platform development tools. A cross-platform development tool allows a developer to write code for an application in one language, and then generate multiple versions of the application that are each compatible with a respective platform. For example, a cross-platform development tool may allow a developer to write an application in hypertext markup language 5 (HTML5), and then generate versions of the application that can be installed under IOS, ANDROID, WINDOWS, and/or other platforms. Commercially available examples of cross-platform development tools include UNITY by UNITY TECHNOLOGIES, UNREAL ENGINE by EPIC GAMES, XAMARIN PLATFORM, APACHE CORDOVA, which are used to develop games or other applications for web sites, desktop platforms, consoles, and mobile devices.

Another aspect of cross-platform software development involves the usage of third-party libraries, often as part of software development kits (SDKs). Cross-platform development tools may allow developers to code against a third-party library or SDK by way of plugins. For example, an SDK plugin would allow a developer to write code against the SDK in JAVASCRIPT, even though the SDK itself is JAVA code. Multiple plugins may need to be developed for a given cross-platform development tool, e.g., one that interfaces with JAVA code, one that interfaces with OBJECTIVE C code, one that interfaces with C# code, and so on.

Various embodiments of the present disclosure provide a framework for automatic generation of such plugins. Within the framework, the plugin developer would create an abstracted model for software functionality (e.g., an API for an SDK) in an intermediary language like extensible markup language (XML). The model would include the operations, request types, and response types of the SDK that the plugin developer wishes to expose. The framework would then use the model to automatically generate files necessary to create a plugin for the cross-platform development tool. Where the target platform is JAVA and the application is being written in JAVASCRIPT, the framework would generate both JAVA and JAVASCRIPT code necessary to provide the application with a JAVASCRIPT-based application programming interface (API) to the JAVA-based SDK.

Figure 1:
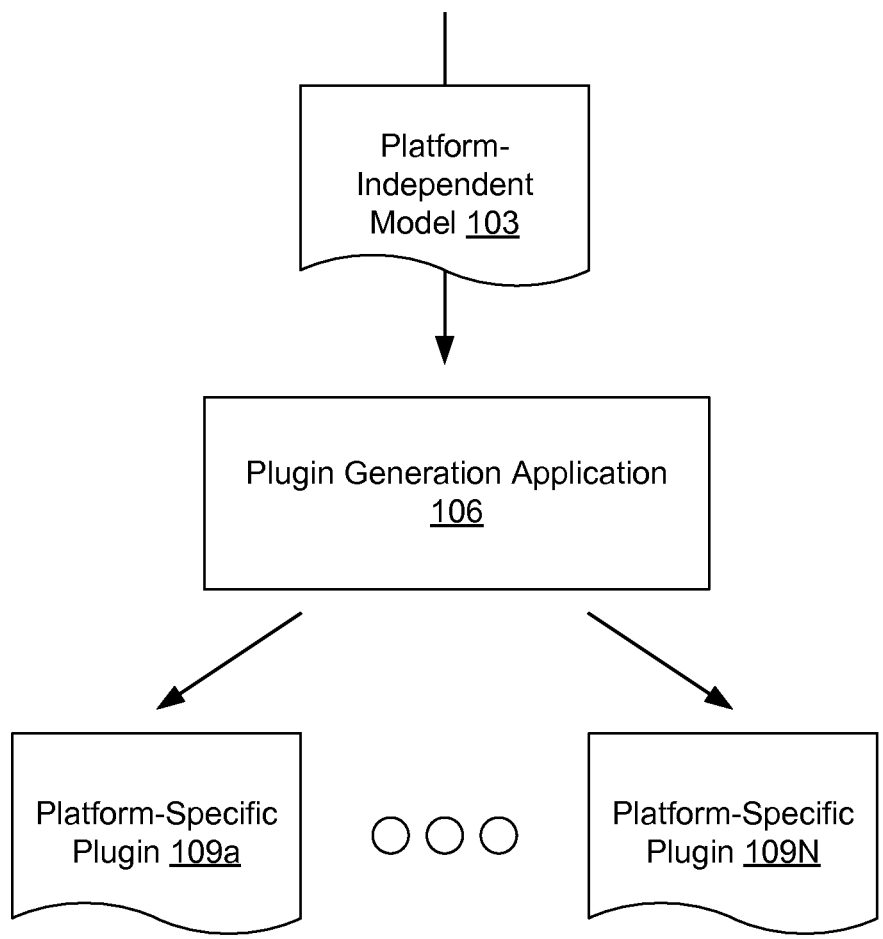
FIG. 1 is a data flow diagram presenting an example data flow in accordance with an embodiment of the present disclosure

Referring now to FIG. 1, shown is a data flow diagram 100 presenting an example data flow in accordance with an embodiment of the present disclosure. To begin, a developer defines a platform-independent model 103 for interfacing with a software library or software development kit (SDK). For example, the platform-independent model 103 may be written in extensible markup language (XML), JAVASCRIPT object notation (JSON), yet another markup language (YAML), web services description language (WSDL), a custom definition language, or another language. The platform-independent model 103 may define operations, request types, and response types for a plugin. The platform-independent model 103 is then provided to the plugin generation application 106.

The plugin generation application 106 processes the platform-independent model 103 to automatically generate one or more of a plurality of platform-specific plugins 109a . . . 109N. Each platform-specific plugin 109 interfaces with a cross-platform development tool that allows a developer to code against the library or SDK for the respective platform. The platform-specific plugin 109 therefore provides an application programming interface (API) that allows the cross-platform development tool to link with pre-existing platform-specific code corresponding to the library or SDK. In the following discussion, a general description of the system and its components is provided, followed by a discussion of the operation of the same.

Figure 2:
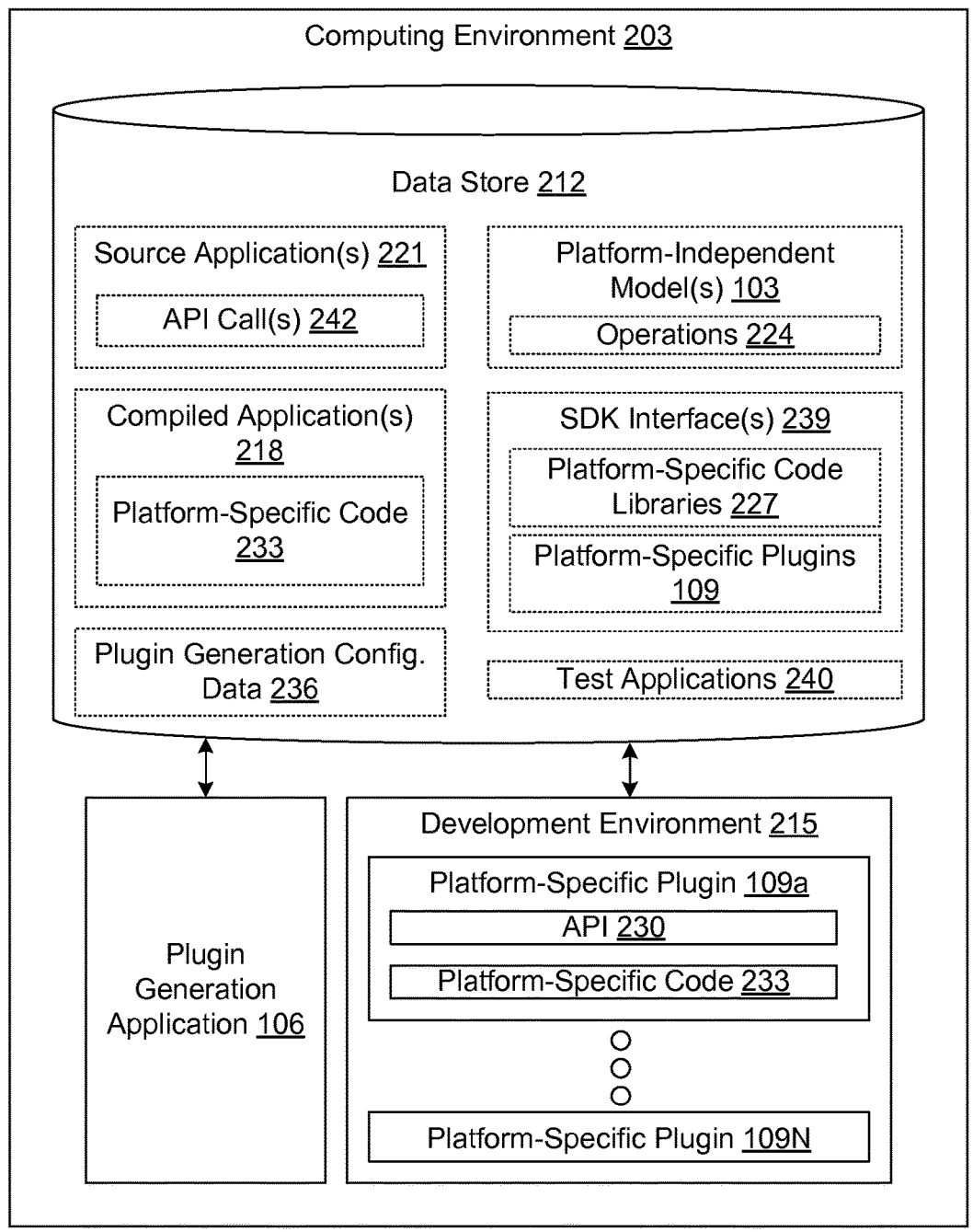
FIG. 2 is a schematic block diagram of a computing environment according to various embodiments of the present disclosure.

With reference to FIG. 2, shown is a computing environment 203 according to various embodiments. The computing environment 203 may comprise, for example, a server computer, a client computer, or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a plugin generation application 106, a development environment 215, and other applications, services, processes, systems, engines, or functionality not discussed in detail herein.

The development environment 215 is executed to generate compiled applications 218 from source applications 221. The development environment 215 may be configured to allow users to write source code for source applications 221. To this end, the development environment 215 may provide editing functionality with element highlighting, syntax checking, debugging tools, code completion tools, and so on. The development environment 215 may be termed an integrated development environment (IDE) or interactive development environment.

In one embodiment, the development environment 215 may correspond to a cross-platform development environment, where source code is written in one language and then compiled for different platforms. For example, the source code may be written in a platform-independent language (e.g., HTML5, JAVA, JAVASCRIPT, etc., and then compiled into a platform-specific version (e.g., an ANDROID application package, an IOS package archive, etc.). Generating or compiling a platform-specific version may depend on the availability of a platform-specific plugin 109 for an application programming interface (API) used in the source code.

The plugin generation application 106 is executed to generate platform-specific plugins 109 for software development kits (SDKs) for development environments 215. In this regard, a platform-independent model 103 is first created to model the operations 224 of an SDK API. Platform-specific code libraries 227 may be available to enable usage of the SDK functionality on a specific platform. The plugin generation application 106 is then executed to generate one or more platform-specific plugins 109, one for each supported target platform, for a given development environment 215. As the SDK is updated, the platform-independent model 103 may also be updated, and the platform-specific plugins 109 may be regenerated as desired. The plugin generation application 106 may also generate sample applications for testing the platform-specific plugins 109.

The development environment 215 may be configured to use a plurality of platform-specific plugins 109a . . . 109N, one for each target platform and for each SDK that is supported. Each platform-specific plugin 109 may support the API 230 of the SDK in the language used by the development environment 215, which may be a platform-independent language. Further, each platform-specific plugin 109 may be associated with platform-specific code 233 that is invoked by a compiled application 218 to perform SDK functionality.

Although the development environment 215 is shown in FIG. 2 as residing within the same computing environment 203 as the plugin generation application 106, the development environment 215 may reside in different computing environments 203 in other embodiments. For example, the plugin generation application 106 may be used by developers of SDKs, while the development environment 215 may be used by developers of applications that use the SDKs. Although a common data store 212 will be described for simplicity, it is understood that developers of the SDK may utilize a data store 212 that is different from that of application developers.

The data stored in the data store 212 includes, for example, one or more source applications 221, compiled applications 218, plugin generation configuration data 236, one or more platform-independent models 103, one or more SDK interfaces 239, one or more test applications 240, and potentially other data. A source application 221 corresponds to the source code for an application. The application may be a mobile application, a desktop application, or another type of application. The source application 221 may include one or more API calls 242 in the language of the source application 221 for SDKs.

The compiled applications 218 correspond to distributable versions of the applications. In one scenario, a compiled application 218 represents a bytecode or machine code version of the source application 221 that has been compiled via the development environment 215. In another scenario, the compiled application 218 may be an interpreted language that may be translated from the language of the source application 221. The compiled application 218 may be natively executable on one or more target platforms, either directly via a processor or by way of an interpreter or virtual machine. The compiled applications 218 may include or otherwise be linked to platform-specific code 233 of one or more SDKs.

The plugin generation configuration data 236 may include configuration parameters for the plugin generation application 106. Such parameters may control mapping of operations 224 in the platform-independent model 103 to methods in an API 230 for the development environment 215. This may include translation of data types, such as integers, Booleans, floating point numbers, etc., to data types supported by the target platform and by the language used in the development environment 215.

The platform-independent model 103 describes a model of a plugin for an SDK that includes operations 224. The operations 224 may each be defined in terms of an operation name, parameters consumed, parameters returned, and the corresponding data types of the parameters. This may include a request definition and a response definition. The operations 224 may include synchronous and asynchronous operations 224. To this end, the platform-independent model 103 may specify events, callback functions, and so on. Thus, a compiled application 218 may register a callback with a platform-specific plugin 109 via the API 230, and the platform-specific plugin 109 may return one or more events asynchronously via the callback. In one embodiment, the platform-independent model 103 is defined in one or more XML files.

The platform-independent model 103 may employ a set of data types that map to data types used by all of the supported target platforms. In some cases, a data type of the platform-independent model 103 may map to a primitive data time for one target platform and a composite data type on another target platform. For example, an operation 224 in a platform-independent model 103 may produce a list. This list may map to a native list data data type for one target platform, but the plugin generation application 106 may generate a customized composite data type, such as a list object class with appropriate methods to manipulate the list, for another target platform that does not have a native list data type.

The SDK interfaces 239 correspond to one or more SDKs. In some scenarios, the SDK may correspond to functionality of a network service, such as a network storage service, a shipment tracking service, an online ordering service, a utility computing service, a social networking service, and/or other types of services. In other scenarios, the SDK may correspond to a device-specific feature (e.g., allowing access to a camera feature, a location-finding feature, etc.) or business logic. An SDK interface 239 may include platform-specific code libraries 227 of platform-specific code 233 and platform-specific plugins 109.

The test applications 240 may be automatically generated by the plugin generation application 106 in order to test the functionality of platform-specific plugins 109. For example, a test application 240 may be configured to provide test input and to show the output for each operation 224 in the platform-independent model 103. To this end, the test application 240 may include a generic user interface that allows a user to specify the test input and to see the output.

Figure 3:
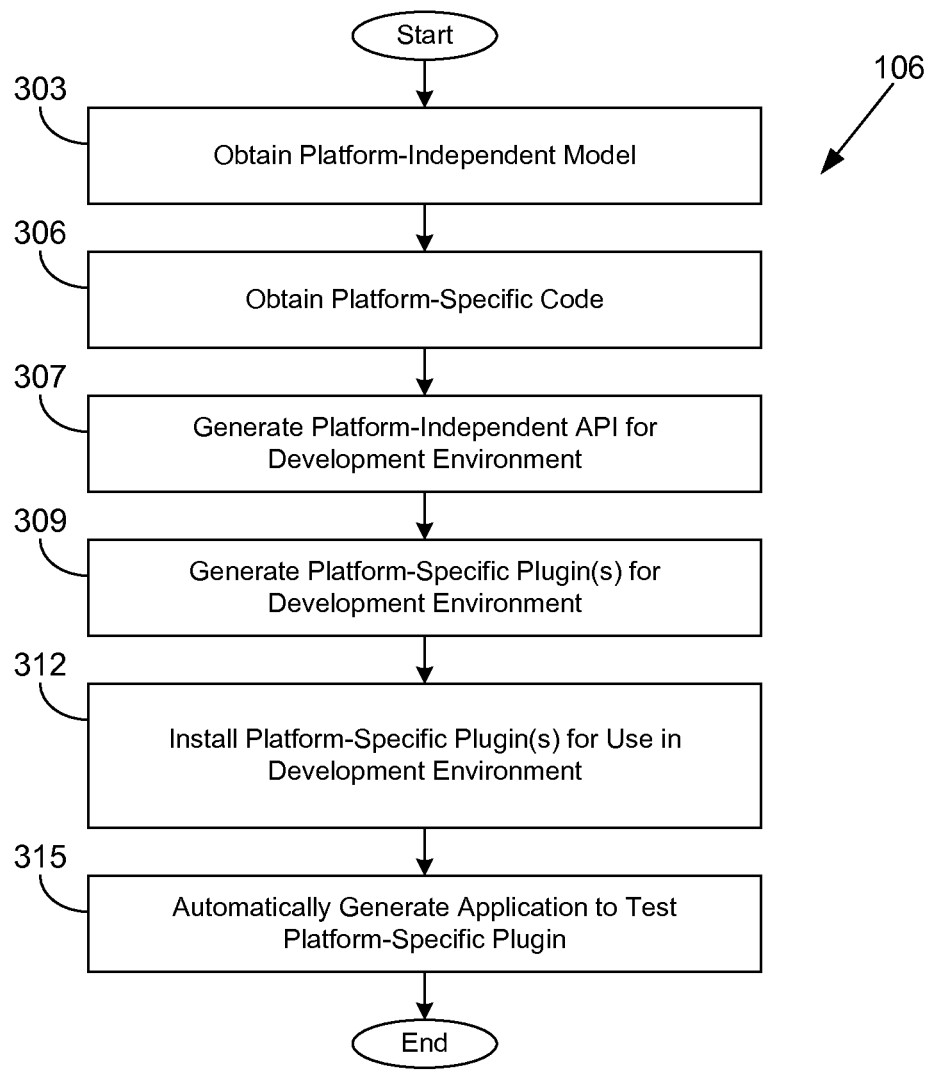
FIG. 3 is a flowchart illustrating one example of functionality implemented as portions of a plugin generation application executed in a computing environment of FIG. 2 according to various embodiments of the present disclosure.

Referring next to FIG. 3, shown is a flowchart that provides one example of the operation of a portion of the plugin generation application 106 according to various embodiments. It is understood that the flowchart of FIG. 3 provides merely an example of the many different types of functional arrangements that may be employed to implement the operation of the portion of the plugin generation application 106 as described herein. As an alternative, the flowchart of FIG. 3 may be viewed as depicting an example of elements of a method implemented in the computing environment 203 (FIG. 2) according to one or more embodiments.

Beginning with box 303, the plugin generation application 106 obtains a platform-independent model 103 (FIG. 2) from the data store 212. In box 306, the plugin generation application 106 may obtain platform-specific code 233 (FIG. 2) from a platform-specific code library 227 (FIG. 2) in the data store 212.

In box 307, the plugin generation application 106 automatically generates a platform-independent application programming interface (API) for the development environment 215 (FIG. 2) from the platform-independent model 103. In this regard, the plugin generation application 106 may convert the operations 224 (FIG. 2) specified by the platform-independent model 103 to an API 230 in a language supported by development environment 215. This language may be a platform-independent language, but different development environments 215 may use different languages, and different platform-independent APIs may be generated for different development environments 215. This conversion may involve code generation in a format specific to the development environment 215. Moreover, this conversion may involve translating a first set of data types to a second, different set of data types. For instance, a floating-point number may be specified as a first data type, and this may be mapped to a data type that is a number that could be either an integer or a floating-point number. In some cases, the conversion may map a data type to a composite data type that is not natively supported by the language supported by the development environment 215.

As a non-limiting example, the platform-independent model 103 may specify an operation 224 named "authenticate" that consumes two parameters that are character strings, named "username" and "password." The operation 224 may be specified to return a Boolean parameter. The plugin generation application 106 may be invoked to generate code for a cross-platform development environment 215 that uses JAVA. Thus, the plugin generation application 106 may stub out a method "public boolean authenticate (String username, String password)."

In box 309, the plugin generation application 106 automatically generates one or more platform-specific plugins 109 (FIG. 2) for corresponding targeted platforms for use in a development environment 215 (FIG. 2). In generating the platform-specific plugins 109, the plugin generation application 106 may map the generated API 230 to platform-specific code 233 that implements the SDK functionality on the target platform. In some cases, this mapping may map a data type from the generated API 230 to a composite data type that is not natively supported by a language employed by the platform-specific code 233. Continuing with the non-limiting example, a target platform may be IOS, and the platform-specific code 233 may implement the "authenticate" operation 224 in OBJECTIVE C. Accordingly, the generated platform-specific plugin 109 would result in a JAVA "authenticate" API call 242 being available for use within the source application 221. When compiled, the development environment 215 would translate the API call 242 to the corresponding OBJECTIVE C code in the platform-specific code 233.

In box 312, the plugin generation application 106 may install the generated platform-specific plugins 109 for use by an installation of the development environment 215. In box 315, the plugin generation application 106 may automatically generate a test application 240 in order to test one or more platform-specific plugins 109. In this regard, the plugin generation application 106 may create one or more versions of source code for the test application 240 from a template based upon the platform-independent model 103. Then, the plugin generation application 106 may compile the source code versions of the test application 240 for the specific target platform(s). Thereafter, the operation of the plugin generation application 106 ends.

Figure 4:
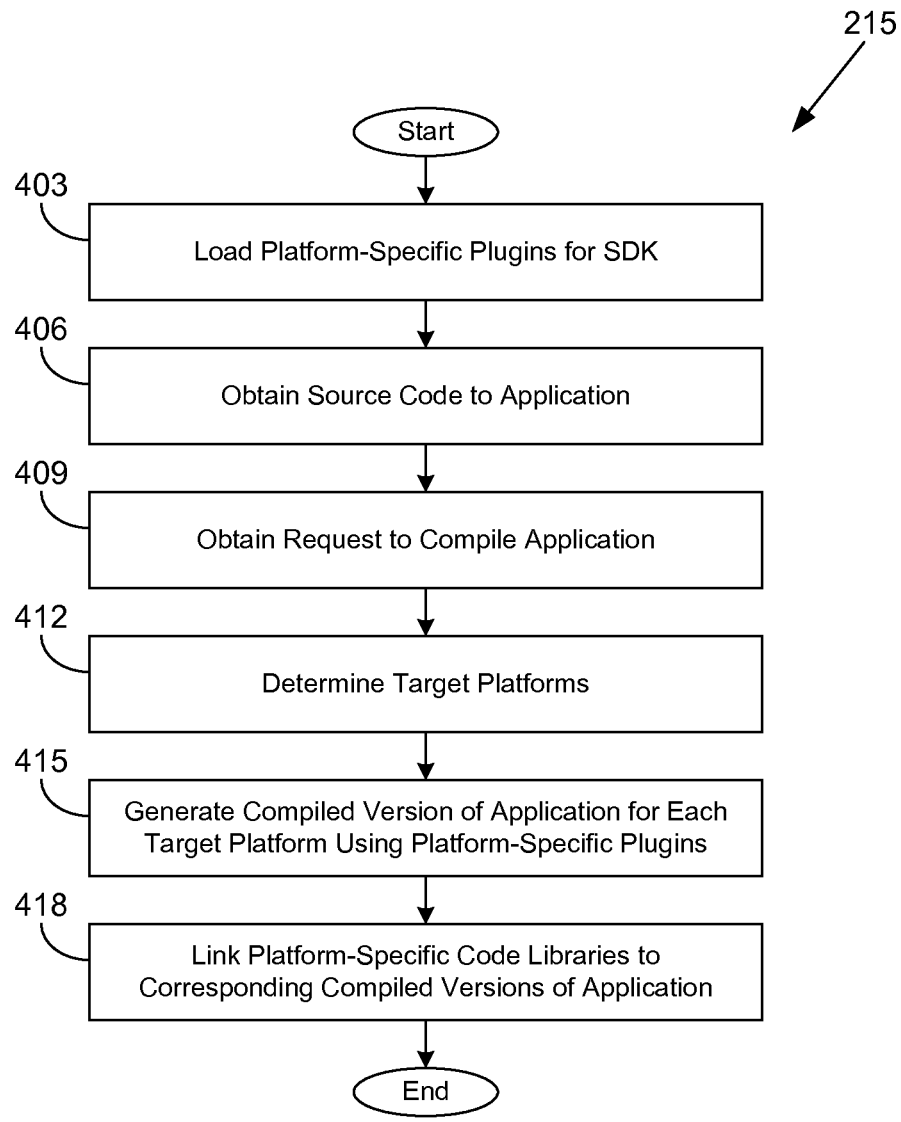
FIG. 4 is a flowchart illustrating one example of functionality implemented as portions of a development environment executed in a computing environment of FIG. 2 according to various embodiments of the present disclosure.

Turning now to FIG. 4, shown is a flowchart that provides one example of the operation of a portion of the development environment 215 according to various embodiments. It is understood that the flowchart of FIG. 4 provides merely an example of the many different types of functional arrangements that may be employed to implement the operation of the portion of the development environment 215 as described herein. As an alternative, the flowchart of FIG. 4 may be viewed as depicting an example of elements of a method implemented in the computing environment 203 (FIG. 2) according to one or more embodiments.

Beginning with box 403, the development environment 215 loads one or more platform-specific plugins 109 (FIG. 2) for a software development kit (SDK). In box 406, the development environment 215 obtains source code to an application, i.e., a source application 221 (FIG. 2). The source application 221 includes one or more API calls 242 (FIG. 2) for the SDK in the language used by the development environment 215.

In box 409, the development environment 215 obtains a request to compile the application. In box 412, the development environment 215 determines one or more target platforms for which the application is to be compiled. In box 415, the development environment 215 generates a compiled version of the application, i.e., a compiled application 218 (FIG. 2), for each target platform using a corresponding platform-specific plugin 109. The platform-specific plugin 109 enables the translation of the API call 242 to the API 230 (FIG. 2) into a call in the compiled application 218 to platform-specific code 233 (FIG. 2) implementing the SDK functionality. In box 418, the development environment 215 may link one or more platform-specific code libraries 227 (FIG. 2) to the corresponding compiled applications 218 to implement the SDK functionality as directed via the respective platform-specific plugin 109. Thereafter, the operation of the portion of the development environment 215 ends.

Figure 5:
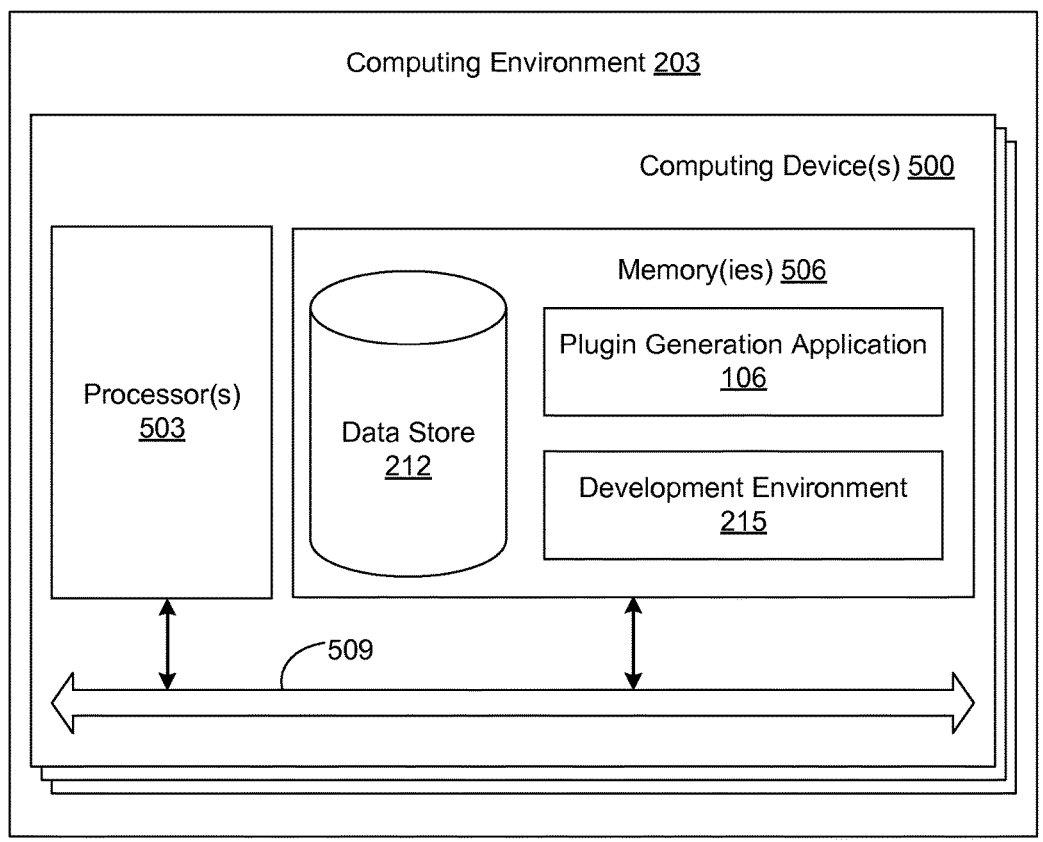
FIG. 5 is a schematic block diagram that provides another example illustration of the computing environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer, client computer, or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the plugin generation application 106, the development environment 215, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the plugin generation application 106, the development environment 215, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the plugin generation application 106 and the development environment 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the plugin generation application 106 and the development environment 215, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the plugin generation application 106 and the development environment 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:

obtain at least one extensible markup language (XML) file defining a platform-independent model for an application programming interface (API) to a software development kit (SDK);

generate a platform-independent version of the API based at least in part on the platform-independent model, the platform-independent version of the API being in a language employed by a cross-platform development environment; and generate a plurality of platform-specific plugins for the cross-platform development environment based at least in part on a plurality of platform-specific code libraries implementing the SDK for a plurality of platforms, individual ones of the platform-specific plugins providing the platform-independent version of the API to the SDK for a corresponding platform of the plurality of platforms.

2. The non-transitory computer-readable medium of claim 1, wherein when executed the program further causes the at least one computing device to at least generate another platform-independent version of the API based at least in part on the platform-independent model, the other platform-independent version of the API being in another language employed by another cross-platform development environment.

3. The non-transitory computer-readable medium of claim 1, wherein when executed the program further causes the at least one computing device to at least translate a data type used by the platform-independent version of the API into a non-native composite data type.

4. The non-transitory computer-readable medium of claim 1, wherein when executed the program further causes the at least one computing device to at least install the plurality of platform-specific plugins for use by an installation of the cross-platform development environment.

5. The non-transitory computer-readable medium of claim 1, wherein when executed the program further causes the at least one computing device to at least automatically generate a test application from the platform-independent model that facilitates testing a particular platform-specific plugins of the plurality of platform-specific plugins.

6. The non-transitory computer-readable medium of claim 1, wherein the cross-platform development environment is configured to compile an application authored in the language into a plurality of versions corresponding to the plurality of platforms, and a call to the platform-independent version of the API in the application for individual ones of the plurality of versions is configured to be linked by the cross-platform development environment to respective ones of the plurality of platform-specific code libraries.

7. A system, comprising:

at least one computing device; and at least one application executable in the at least one computing device, wherein when executed the at least one application causes the at least one computing device to at least:

obtain a platform-independent model for particular software functionality;

generate platform-independent software functionality based at least in part on the platform-independent model, the platform-independent software functionality providing the particular software functionality in a language associated with a cross-platform development environment; and generate a platform-specific plugin for the cross-platform development environment, the platform-specific plugin providing the platform-independent software functionality for a particular platform of a plurality of platforms.

8. The system of claim 7, wherein the particular software functionality corresponds to an application programming interface (API) for a software development kit (SDK).

9. The system of claim 7, wherein when executed the at least one application further causes the at least one computing device to at least install the platform-specific plugin for use by the cross-platform development environment.

10. The system of claim 7, wherein the platform-independent model employs a set of data types that map to data types used by all of the plurality of platforms.

11. The system of claim 7, wherein when executed the at least one application further causes the at least one computing device to at least generate a plurality of platform-specific plugins, and individual ones of the plurality of platform-specific plugins provide the platform-independent software functionality for a corresponding platform of the plurality of platforms.

12. The system of claim 7, wherein the platform-specific plugin is generated based at least in part on platform-specific code corresponding to the particular software functionality.

13. The system of claim 7, wherein the language associated with the cross-platform development environment is a platform-independent language.

14. The system of claim 7, wherein the platform-independent model defines a plurality of operations for the software functionality, and individual ones of the plurality of operations comprise a request definition and a response definition.

15. A method, comprising:
 obtaining, via at least one computing device, a platform-independent model for an application programming interface (API) to a software development kit (SDK);
 generating, via the at least one computing device, a platform-independent version of the API for a cross-platform development environment based at least in part on the platform-independent model;
 generating, via the at least one computing device, a platform-specific plugin for the cross-platform development environment, the platform-specific plugin providing the platform-independent version of the API to the SDK for a particular platform;
 installing, via the at least one computing device, the platform-specific plugin for use by the cross-platform development environment; and
 compiling, via the at least one computing device, an application using the cross-platform development environment to generate a compiled version of the application for the particular platform, the application including a call to the platform-independent version of the API.

16. The method of claim 15, wherein the platform-independent model defines a plurality of operations, and generating the platform-independent version of the API further comprises translating, via the at least one computing device, individual ones of the plurality of operations into a language employed by the cross-platform development environment.

17. The method of claim 16, wherein the plurality of operations employ a first set of data types, and the translating further comprises translating, via the at least one computing device, the first set of data types to a second set of data types used in the language.

18. The method of claim 17, wherein at least one of the second set of data types is a composite data type that is not native to the language.

19. The method of claim 15, further comprising:
 obtaining, via at least one computing device, a platform-specific code library for the platform and the SDK; and
 wherein compiling the application further comprises linking, via the at least one computing device, the compiled version of the application to the platform-specific code library.

20. The method of claim 15, wherein the platform-independent model defines a plurality of operations for the API, and individual ones of the plurality of operations comprise a request definition and a response definition.

* * * * *